US011370139B2

(12) United States Patent
Bonnet et al.

(10) Patent No.: US 11,370,139 B2
(45) Date of Patent: Jun. 28, 2022

(54) DEVICE AND METHOD FOR CUTTING PARTS CONSISTING OF A METAL OR COMPOSITE MATERIAL AND PARTS PRODUCED WITH SUCH A METHOD

(71) Applicant: Mecachrome France, Amboise (FR)

(72) Inventors: Cedric Bonnet, Blois (FR); Arnaud De Ponnat, Vouvray (FR); Olivier Martin, Sainte Genevieve des Bois (FR); Ludovic Loison, Tours (FR); Antoine Bosselut, Limeray (FR); Frederic De Oliveira Cunha, Amboise (FR)

(73) Assignee: Mecacahrome France, Amboise (FR)

( * ) Notice: Subject to any disclaimer, the term of this patent is extended or adjusted under 35 U.S.C. 154(b) by 0 days.

(21) Appl. No.: 14/899,728

(22) PCT Filed: Jun. 18, 2014

(86) PCT No.: PCT/FR2014/051516
§ 371 (c)(1),
(2) Date: Dec. 18, 2015

(87) PCT Pub. No.: WO2014/202907
PCT Pub. Date: Dec. 24, 2014

(65) Prior Publication Data
US 2016/0136831 A1    May 19, 2016

(30) Foreign Application Priority Data
Jun. 19, 2013   (FR) ..................... 13/55773

(51) Int. Cl.
*B23D 57/02*        (2006.01)
*B26D 7/00*         (2006.01)
(Continued)

(52) U.S. Cl.
CPC ........... *B26D 7/0006* (2013.01); *B23D 57/02* (2013.01); *B27B 17/00* (2013.01); *B32B 3/30* (2013.01);
(Continued)

(58) Field of Classification Search
CPC ...... B23D 55/082; B23D 61/14; B23D 61/16; B23D 57/02; B28D 5/045; B28D 1/30; E21C 25/30
(Continued)

(56) References Cited

U.S. PATENT DOCUMENTS 1,695,364 A * 12/1928 Chase ................. B28D 1/06
                                                    125/16.04
1,783,443 A * 12/1930 Morgan ............... E21C 27/128
                                                    261/28
(Continued)

FOREIGN PATENT DOCUMENTS

DE      202004007148 U1    9/2004
DE      102011003996 A1    8/2012
(Continued)

OTHER PUBLICATIONS

International Search Report of PCT/FR2014/051516, dated Aug. 7, 2014.

*Primary Examiner* — Kenneth E Peterson
(74) *Attorney, Agent, or Firm* — Banner & Witcoff, Ltd.

(57) ABSTRACT

The invention relates to a device, a method and an assembly of parts produced by cutting in a block B of metal or composite material, following a determined trajectory. The device comprises a guide (3) forming said trajectory and a support (chain 9) mounted in the guide in a sliding manner, comprising a lateral blank (23) provided with at least one
(Continued)

cutting plate (24) comprising a protruding cutting edge (25) arranged so as to carry out the cutting in a normal direction (26) in relation to the blank.

19 Claims, 5 Drawing Sheets

(51) Int. Cl.
    *B27B 17/00*     (2006.01)
    *B32B 3/30*     (2006.01)
    *B32B 15/01*     (2006.01)
    *B32B 27/08*     (2006.01)

(52) U.S. Cl.
    CPC .............. *B32B 15/01* (2013.01); *B32B 27/08* (2013.01); *B32B 2262/106* (2013.01)

(58) Field of Classification Search
    USPC ................. 83/820; 125/21; 299/82.1–84.1
    See application file for complete search history.

(56) References Cited

U.S. PATENT DOCUMENTS

| | | | | |
|---|---|---|---|---|
| 2,086,573 A * | 7/1937 | Osgood | ................ | E21F 13/063 299/63 |
| 2,329,875 A * | 9/1943 | Cartlidge | ............. | E21C 27/122 173/118 |
| 2,410,203 A * | 10/1946 | Culley | ................ | A01G 23/043 111/101 |
| 2,630,308 A * | 3/1953 | Moon | ................... | E21C 27/128 299/22 |
| 2,684,236 A * | 7/1954 | Fulke | ...................... | E21C 27/04 299/84.1 |
| 2,730,346 A * | 1/1956 | Joy | ......................... | E21C 27/04 299/83.1 |
| 2,755,570 A * | 7/1956 | Blackburn | .......... | A01G 23/043 111/101 |
| 2,807,452 A * | 9/1957 | Joy | ......................... | E21C 25/36 299/83.1 |
| 2,823,022 A * | 2/1958 | Smith | ................... | E21C 27/124 299/59 |
| 2,829,876 A * | 4/1958 | Bailey | ................. | E21C 27/124 299/59 |
| 2,995,352 A * | 8/1961 | Joy | ....................... | E21C 27/124 299/59 |
| 3,362,754 A * | 1/1968 | Morrow | ................. | E21C 35/19 299/82.1 |
| 3,550,962 A * | 12/1970 | Goodrich | ................ | E21C 25/28 299/82.1 |
| 3,561,310 A * | 2/1971 | Deeks | .................. | B23D 61/123 83/820 |
| 3,676,941 A * | 7/1972 | Cohrs | .................. | A01G 23/043 111/101 |
| 3,886,926 A * | 6/1975 | Hall | ..................... | B23D 61/185 125/21 |
| 4,364,294 A * | 12/1982 | Eccardt | ................ | B23D 53/045 83/454 |
| 4,784,033 A * | 11/1988 | Hayden | ................ | B23D 61/121 407/119 |
| 5,226,404 A * | 7/1993 | Mogi | ..................... | B27B 17/08 125/21 |
| 5,365,914 A * | 11/1994 | Wenger | ................. | B23D 57/00 125/21 |
| 5,950,734 A * | 9/1999 | Salviato | ............... | A01G 23/043 172/19 |
| 6,054,671 A * | 4/2000 | Shelton | ................ | B27B 17/025 219/121.6 |
| 6,883,412 B1 * | 4/2005 | Turfitt | .................... | B23D 61/04 83/835 |
| 2007/0169605 A1 * | 7/2007 | Szymanski | ............ | B23D 61/06 83/834 |
| 2008/0276781 A1 * | 11/2008 | Egger | .................... | B23D 61/14 83/661 |
| 2009/0126712 A1 * | 5/2009 | Kullmann | ............ | B23D 61/121 125/21 |
| 2011/0174285 A1 * | 7/2011 | Nishino | ............... | B28D 5/0076 125/21 |
| 2012/0186162 A1 * | 7/2012 | Gillet | ..................... | B23D 61/14 51/309 |
| 2013/0187438 A1 * | 7/2013 | Hall | ...................... | E21C 35/183 299/113 |
| 2015/0290833 A1 * | 10/2015 | Rabinovich | ............ | B27B 33/14 144/117.1 |
| 2016/0129664 A1 * | 5/2016 | De Ponnat | ............ | B23D 57/02 428/600 |

FOREIGN PATENT DOCUMENTS

| | | |
|---|---|---|
| EP | 0266022 A2 | 5/1988 |
| WO | 2014072661 A1 | 5/2014 |

* cited by examiner

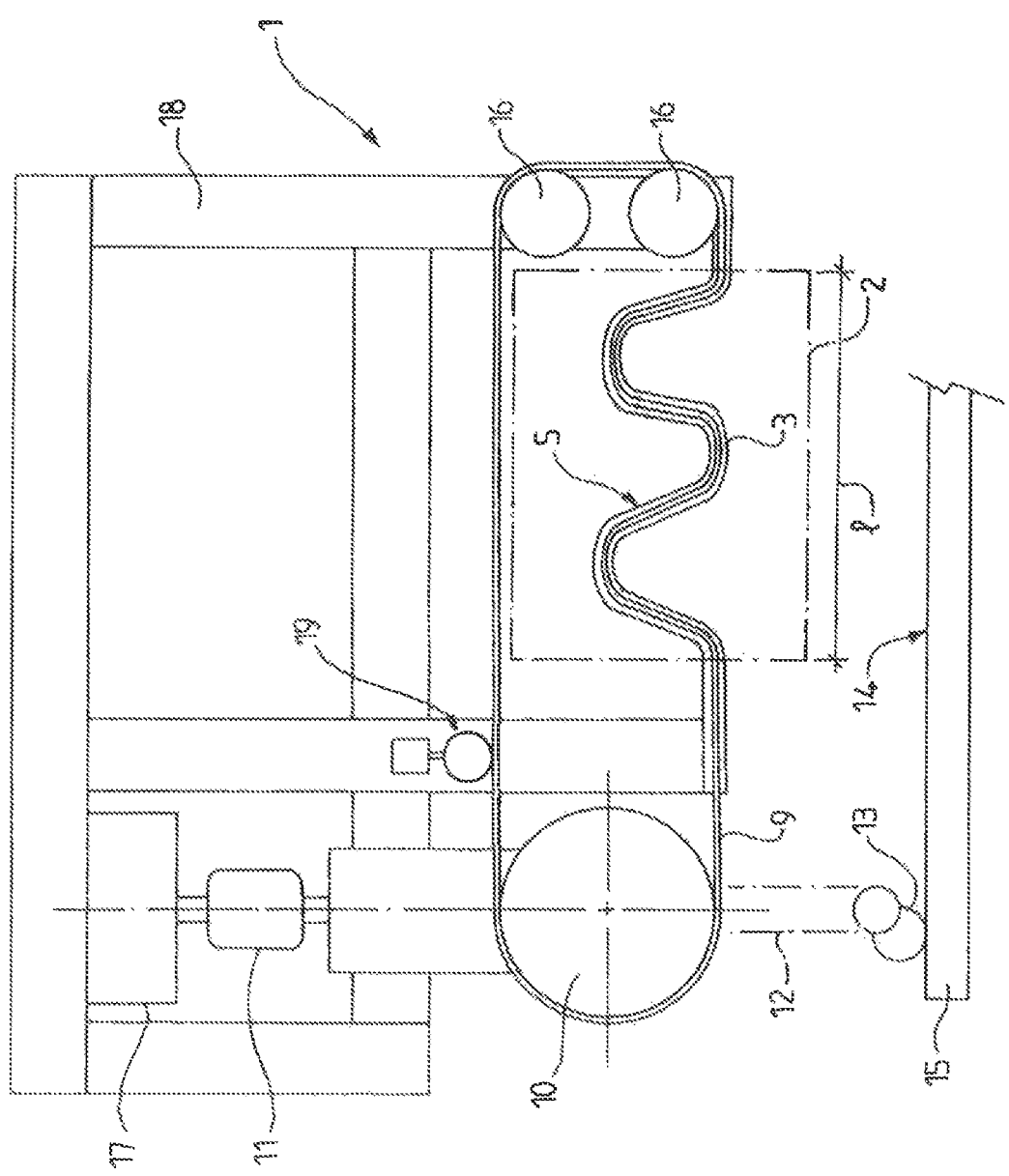

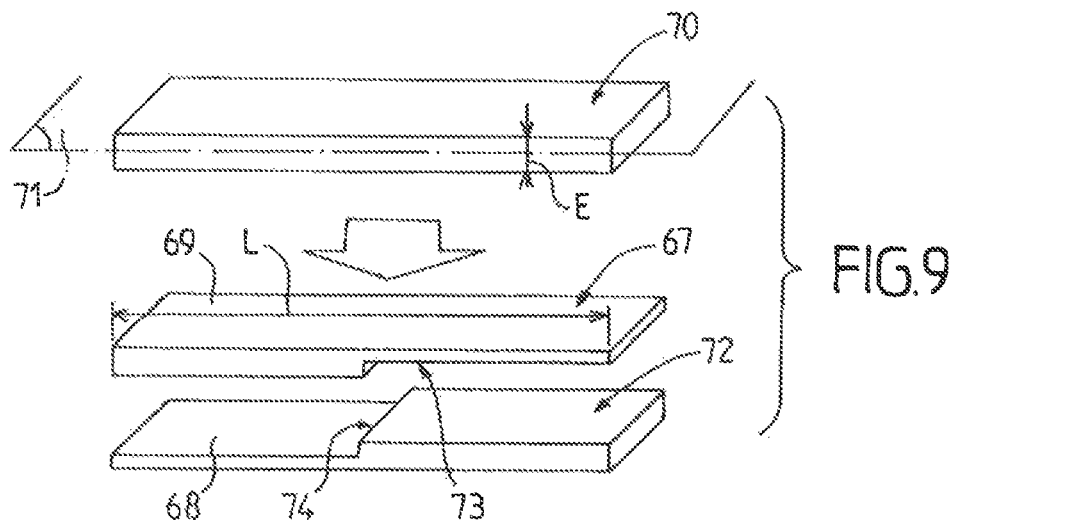
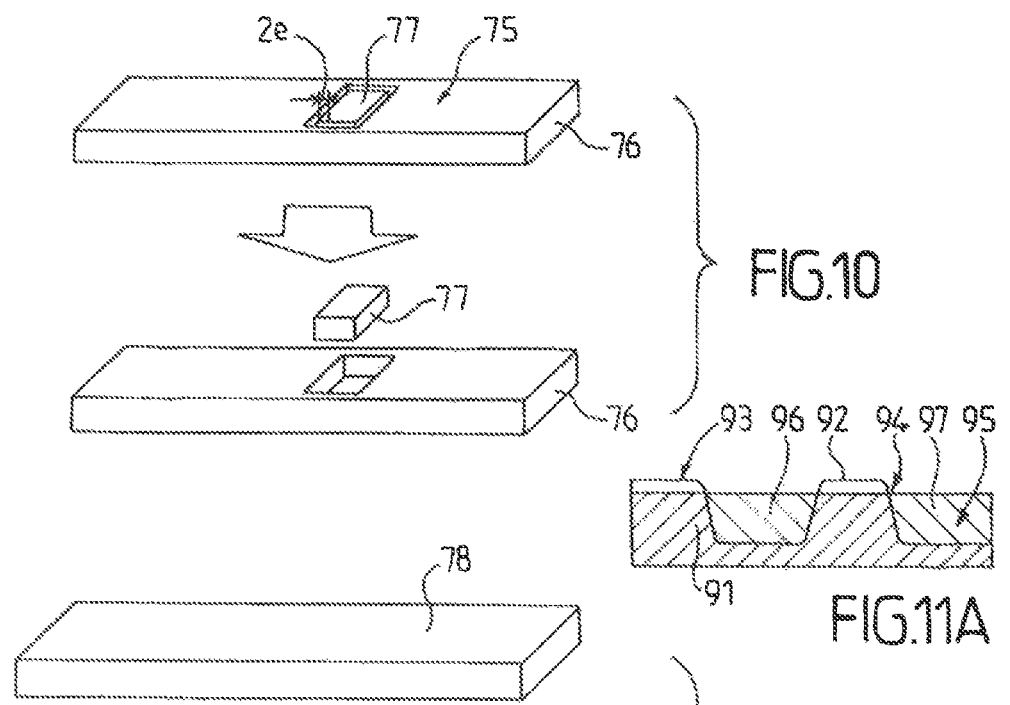
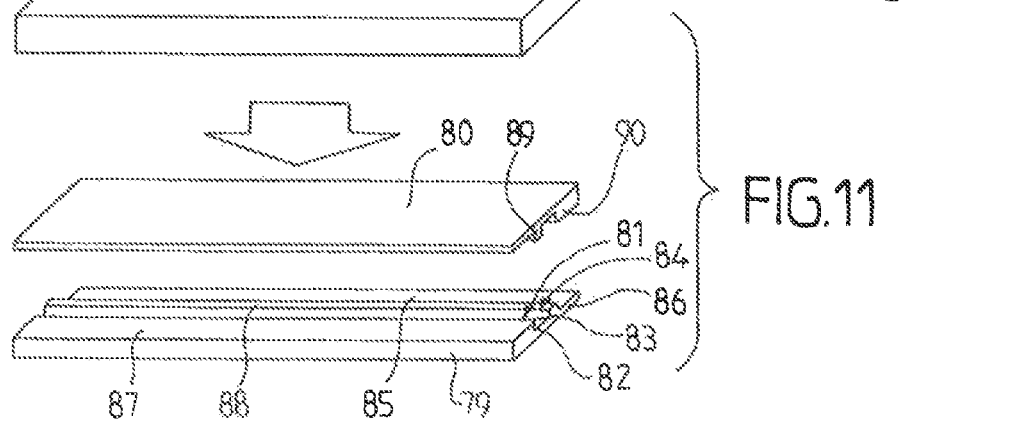

DEVICE AND METHOD FOR CUTTING PARTS CONSISTING OF A METAL OR COMPOSITE MATERIAL AND PARTS PRODUCED WITH SUCH A METHOD

The present invention relates to a device for cutting a part made of metal or composite material following a determined trajectory.

It also relates to a method for cutting, following a determined trajectory, such a metal or composite part, and the parts obtained with such a method.

It is particularly, although not exclusively, applicable to the field of cutting of very hard mechanical parts, that is to say parts with a Rockwell hardness greater than 30, notably to form preforms of parts made of metal (notably aluminum, titanium, steels) or composite (notably with thermosetting or thermoplastic matrices and carbon fibers) that can for example be used in aeronautics.

More specifically, and in the case of the manufacturing of a metal mechanical part, it is known practice to start with a block of material, called rough piece, for example foundry material, then to machine it to thus obtain a preform (half-finished product) of the part sought. This preform is then refined to form the finished product.

The closer the resulting preform is to the desired final form, the less need there is to rework the part and the less scrap of material is produced.

There is therefore a need for a device and a method that make it possible to accurately produce complex forms from a rough piece, and do so in a way that is as close as possible to the form of the part, which makes it possible to limit the number of steps and the material waste.

Blade or chain saw devices are already known that are suitable for performing cuts along determined trajectories.

However, these devices are concerned on the one hand with sawing along rectilinear trajectories and, on the other hand, the cutting of soft and/or fibrous materials such as wood.

They are not therefore suitable for forming preforms of harder metal or composite parts. Nor do they allow for complex trajectories.

Also known [DE 20 2004 007 148] is a device comprising a chain guide provided with teeth with protruding cutting edges.

Such a device does not however make it possible to cut in the width and/or the length of a plate (that is to say in its large dimensions) but only in the direction of the thickness. Nor, and particularly, does it allow for cutting with a complicated trajectory, as is the case with a sinusoidal trajectory.

Also known are cutting devices based on electro-erosion or wire cutting, by waterjet or by laser.

While these techniques may be used to machine complex forms, they still have to be formed from regular surfaces (rectilinear generatrices) and over small cutting depths (preferentially ≤300 mm).

The present invention aims to provide a cutting device and method that meets the requirements of the practice better than those previously known, notably in that it allows for a saving on machining time compared to the known techniques, in that it allows for cuts, with a higher chip production rate, of complex forms, for trajectories with numerous changes of direction that are also close together, and over lengths and/or widths of parts of large dimensions.

Large dimensions should be understood to mean dimensions with parts to be cut greater than 600 mm, for example greater than 1 m, 1 m 50 or 2 m, or even more.

The thickness of the block from which the parts are cut can however, and for its part, be less than 300 mm (often the case in aeronautics) or greater, even greater than 600 mm, and this in a nonlimiting manner. It can for example be less than 200 mm, for example of the order of 100 mm, the limit being that of the thickness of the parts obtained and of the transverse size of the cutting slot.

The present invention also makes it possible to save on material for each part produced (up to 30% compared to the prior art) because of the control of the geometry of the form of the cut.

It also allows, and relates to, in one of its embodiments, the nesting of a number of complex preforms in one and the same rough piece and/or starts notably from the idea of having the cutting system progressively penetrate into the block not just the cutting part, namely the cutting inserts, but also its guiding part, namely its guide.

For this, the invention essentially proposes a device for cutting a part from a block of metal or composite material following a determined trajectory, comprising a guide forming said trajectory and a support for at least one cutting element, flexible or articulated, characterized in that the support is slidingly mounted in the guide, and in that it comprises a lateral blank provided with at least one cutting insert forming the cutting element, comprising a protruding cutting edge arranged to perform the cutting in a normal direction in relation to said blank.

Advantageously, the guide forms a trajectory with at least one change of direction.

A trajectory with at least one change of direction should be understood as meaning a trajectory that is rectilinear or curved in a plane parallel to said blank of the chain which exhibits at least one angle or one point of inflection.

More advantageously, the guide forms a trajectory having at least two points of inflection.

A trajectory with at least two points of inflection should be understood to mean a trajectory that is rectilinear or curved in the plane parallel to the blank which exhibits at least two changes of concavity or at least two series of two opposing angles in relation to the same side.

In other words, what is meant is a trajectory, for example straight, that changes direction at least four times in said axial plane, and/or that generates a cutting line with at least two undulations and/or four opposing angles two by two in relation to a side (for example greater than 5°) in relation to said straight line.

In an advantageous embodiment, the support is an endless chain.

Also advantageously, the guide comprises a longitudinal cavity, for passage of the support or of the chain, of determined width, and the insert(s) are arranged to perform the cutting over a width greater than said determined width.

The cavity is, for example, a fork or a clamp or a groove.

Width should be understood to mean the dimension in the longitudinal plane parallel to the blank and orthogonal to the trajectory.

In other words, in this embodiment, the cutting insert or inserts and their cutting edges have an overall bulk (or width) greater widthwise than that of the guide.

Such an arrangement will allow for the introduction of the links, of the cutting inserts and of the guide into the block of material, that is to say the rough piece, and do so as the cutting progresses and over the entire thickness of said block.

This complete introduction allowed by the lateral arrangement for holding of the device and the normal attack in relation to the blank of the chain and of the cutting inserts, and this according to the determined trajectory of the chain, more particularly allows for complex part cutting geometries.

In advantageous embodiments, there is also and/or additionally recourse to one and/or the other of the following arrangements:

- the guide comprises a longitudinal cavity for passage of the chain (or of the support), said cavity being provided on one side with a holed lateral wall defining a longitudinal slot and the chain (or support) comprises a number of lateral guiding cheeks distributed regularly along the chain, said cheeks comprising peripheral edges arranged to cooperate by friction or rolling with the sides of said slot on the outer face of said holed lateral wall;
- the chain being formed by an assembly of links, each link is formed by two parallel axes linked together, on either side, by two link plates, the lateral cheeks being formed by certain of the link plates between two adjacent axes;
- the cutting insert is fixed onto a lateral cheek forming an insert-holder;
- the insert-holder comprises two cylindrical voids cooperating respectively with the end of the axis of the adjacent links and/or a slug secured to said end;
- the cavity comprises at least one first internal longitudinal central rib arranged to cooperate by friction or rolling with the axes of mutual articulation of the links;
- the cavity comprises a second central rib opposite the first rib;
- the orthogonal distance between the first and the second rib is equal to the diameter D of the articulation axes+d, with d less than 0.1 mm;
- the guide is prestressed in the longitudinal direction of the chain and/or of the guide (i.e. in the transverse direction of the guide).

Prestressed should be understood to mean tightened with a predetermined pulling force, for example greater than 50 daN;

- the device comprises emulsion lubrication means by spraying of the interior of the guide. The spraying rate is then a function of the cutting parameters, and is determined in a manner that is known per se;
- the device comprises means for laterally clamping the guide at the ends, arranged to maintain and rigidify the guide in the three directions of an axonometric reference frame. The clamping means are for example formed by gripping parts that are known per se, by screw or cylinder;
- the cutting insert comprises a setback having a face of concave form following an acute or rightangle in relation to the cutting edge, arranged to break up the chips generated at said cutting edge;
- the insert is removable and comprises means for screwfixing onto the insert-holder;
- the trajectory and/or the guide has an at least partly sinusoidal form;
- the chain comprises a number of cutting inserts arranged so that the cutting edges of at least two inserts are staggered, with an overlap of less than 2 mm, for example of 1 mm.

The invention also proposes a cutting method using a device as described above.

It also proposes a method for cutting a part from a block of metal or composite material, by a cutting device following a determined trajectory, in which a flexible or articulated support of at least one cutting element is guided, characterized in that, the support being slidingly mounted in a guide forming said trajectory, said support comprising a lateral blank comprising at least one cutting insert forming the cutting element and provided with a protruding cutting edge, said cutting is performed with said support in a normal direction in relation to said blank.

Advantageously, the trajectory comprises at least two points of inflection.

Advantageously, the cutting line is performed over a width greater than that of the guide and/or the support is formed by a chain made up of an assembly of links.

In an advantageous embodiment, said cutting is performed over a length (depth) of part greater than or equal to 600 mm, for example greater than 3 m, for example greater than 5 m and/or over a width of part and/or of block greater than 600 mm, for example greater than 1 m.

Advantageously, the cutting is performed over a thickness E of block less than 300 mm.

Also advantageously, the part is cut according to a trajectory comprising at least one change of direction.

In an advantageous embodiment, the guide is traction prestressed before cutting.

Advantageously, the trajectory comprises a number (more than two) of changes of directions and/or is at least partly sinusoidal.

In an advantageous embodiment, at least two mutually nested corresponding plates or parts are cut simultaneously from a block of determined thickness.

The invention also proposes a set of plates or parts obtained by cutting with the method as described above.

The invention will be better understood on reading the following description of embodiments given hereinbelow by way of nonlimiting example.

The description refers to the accompanying drawings in which:

FIG. 1 is a schematic front view representation of a device according to one embodiment of the invention.

Figure 5:
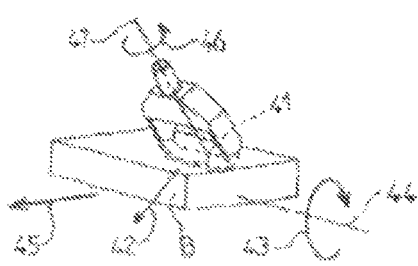

FIG. 5 schematically illustrates the changes of direction that are possible about an axis collinear to that of the chain, in a cut such as can be obtained with the invention.

Figure 6:
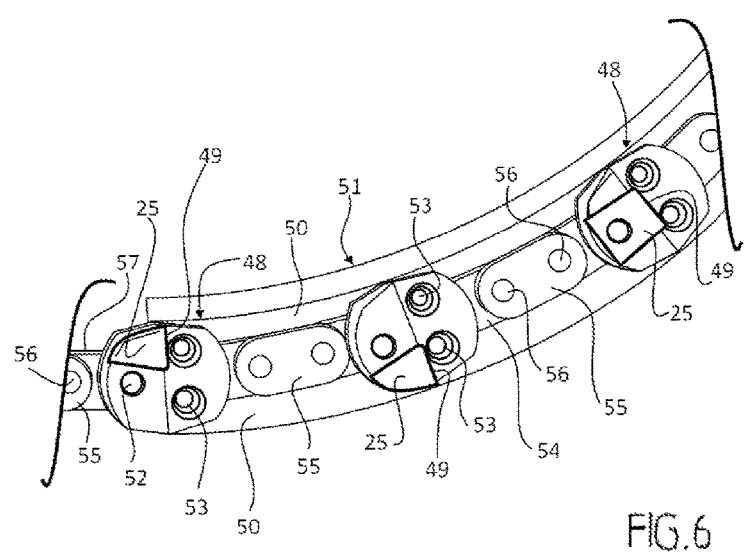

FIG. 6 is a perspective front view of another insert embodiment in its guide and of an adjacent cheek, according to the invention.

Figure 7A:
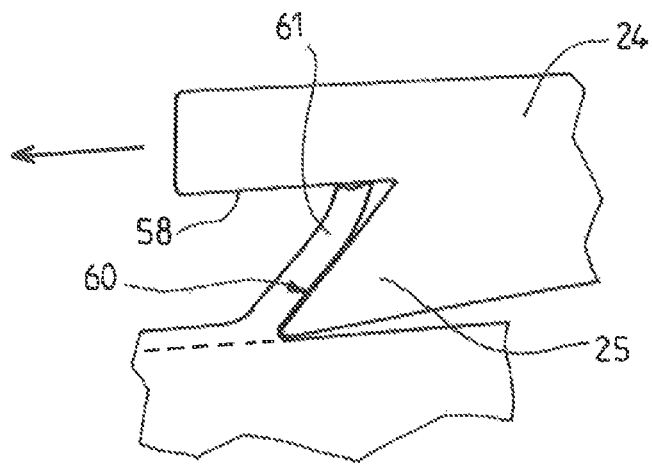
Figure 7B:
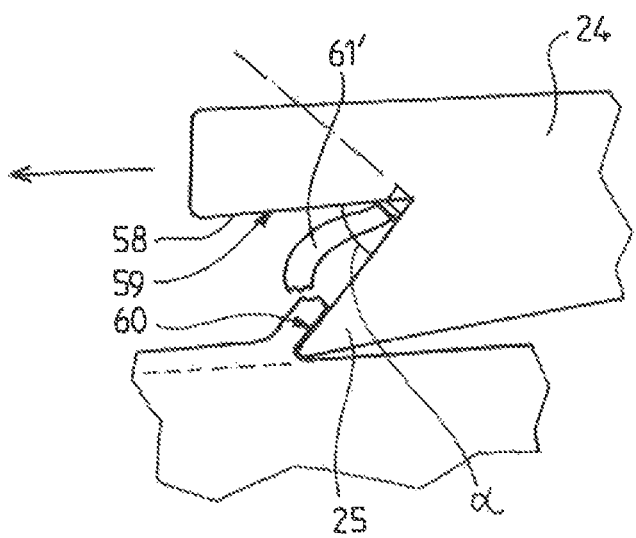

FIGS. 7A and 7B are side views showing the action of a cutting edge of an insert on a block, with chip breakage according to an embodiment of the invention.

Figure 8:
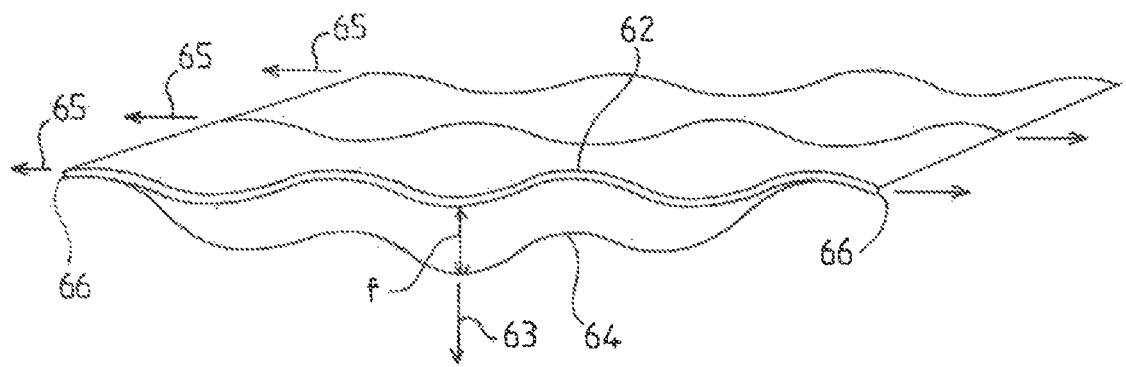

FIG. 8 is a schematic view illustrating the prestressing according to an embodiment of a guide according to the invention.

FIGS. 9 to 11 are perspective views of parts cut according to embodiments of the invention.

The last 11A is a schematic view in cross section of another embodiment of a set of plates according to the invention.

Figure 1A:
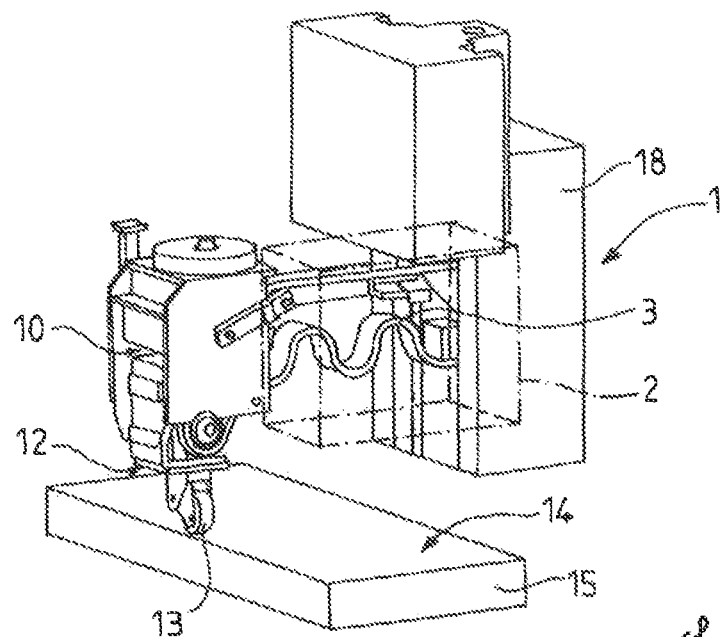
FIG. 1A is a rear view in partial axonometric perspective of the embodiment of FIG. 1.
Figure 1C:
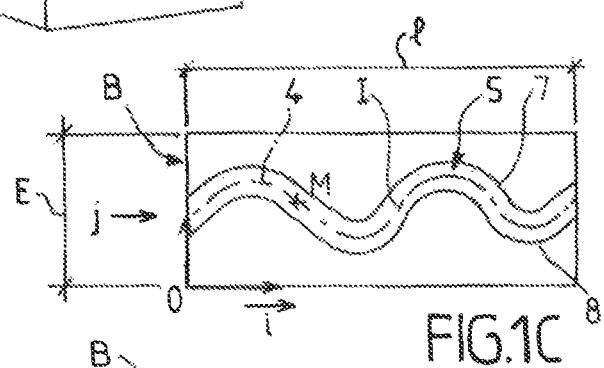
FIG. 1C illustrates the determined trajectory of the cut of FIG. 1B to define its parameterization.
Figure 1B:
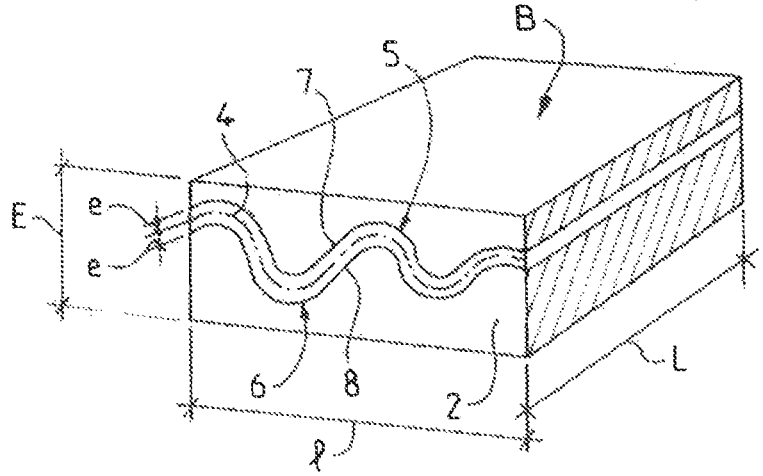
FIG. 1B is a schematic view in perspective of an example of a block cut by a device according to the invention, in which are also specified the length, width and thickness dimensions of a block as used in the case of the present description.

FIGS. 1 and 1A show a device 1 for cutting a part 2 (see FIG. 1B and chain-dotted line in FIGS. 1 and 1A) from a block of metal or composite material B of length L, of width 1 and of thickness E. The device comprises a guide 3 following a determined trajectory 4 (chain-dotted line), the trajectory being, for example, a curve 5 as represented in FIG. 1C.

More specifically, the curve 5 is formed by the place of the points $M(x_0, y_0)$ where $x_0$ and $y_0$ are functions of a parameter t and such that:

$$\overrightarrow{OM} = x_0(t)\vec{i} + y_0(t)\vec{j}$$

with $$\frac{d\overrightarrow{OM}}{dt} = x'_0(t)\vec{i} + y'_0(t)\vec{j}$$

This trajectory forms a cutting line 6 of width $2e$ which is itself defined by the data of the curves 7 and 8 (mutually spaced apart by $2e$). The cutting line is centered on the curve 5 which also forms the neutral fiber of the cut.

The curves 7 and 8 are then defined as follows:

$$\begin{cases} x_1(t) = x_0(t) + y'_0(t) \times \dfrac{e}{\sqrt{x'_0(t)^2 + y'_0(t)^2}} \\ y_1(t) = y_0(t) + x'_0(t) \times \dfrac{e}{\sqrt{x'_0(t)^2 + y'_0(t)^2}} \end{cases} \quad (7)$$

$$\begin{cases} x_2(t) = x_0(t) - y'_0(t) \times \dfrac{e}{\sqrt{x'_0(t)^2 + y'_0(t)^2}} \\ y_2(t) = y_0(t) + x'_0(t) \times \dfrac{e}{\sqrt{x'_0(t)^2 + y'_0(t)^2}} \end{cases} \quad (8)$$

The device 1 comprises an endless chain 9 (see FIG. 1) which is, as is known per se, driven on one side by a rotary belt 10 actuated in rotation by a gear motor 11 and 17, for example electric, the whole being borne by a support carriage 12, and a rolling element 13 to ensure the translation of the system parallel to the table arranged to cooperate with the surface 14 of a guiding plate 15, and the return of the chain is ensured by two pinions 16, idle or not, for spreading the chain.

The motor 11 is controlled in a manner known per se by a programmable logic controller (not represented), to perform the cutting according to the chosen modalities speed of cut, advance, etc.).

The device also comprises a support structure 18 for the whole and means 19 for measuring the tension of the chain, its speed and/or its degree of wear etc., here also in a manner known per se, measurements to which the operation of the programmable logic controller is slaved.

Hereinafter in the description, the same reference numbers will be used to designate similar and/or identical elements.

Figure 2:
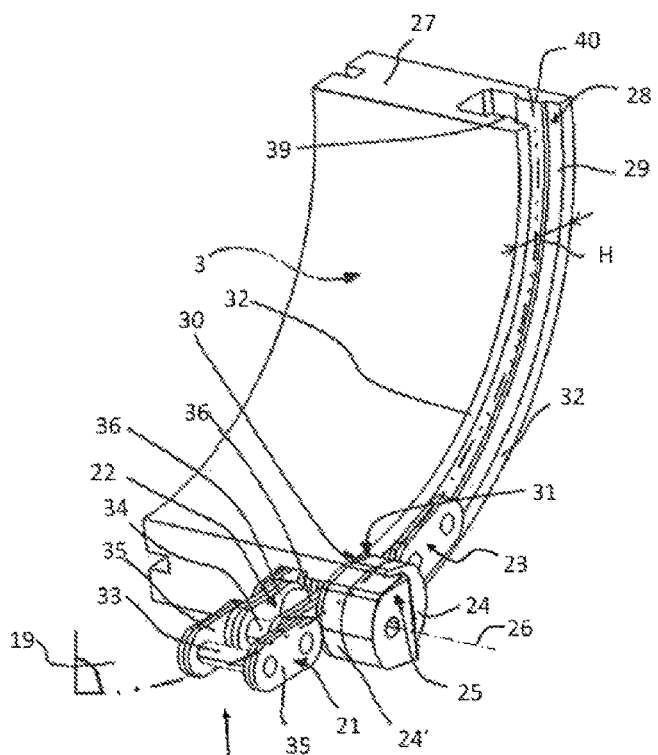
FIG. 2 is a perspective view of a portion of guide with chain according to the embodiment of the invention more particularly described here.

FIG. 2 shows a portion of the endless chain 9 according to the embodiment of the invention more particularly described here.

The chain 9 is symmetrical about a longitudinal axial plane 19. It is formed by an assembly of articulated links 21, 22 comprising, on a lateral blank 23, an insert (24) (fixed onto a seat or insert-holder 24') and provided with a cutting edge 25 protruding in a normal direction (chain-dotted line 26) in relation to the blank 23.

As is apparent in FIGS. 1 to 10, the trajectory 4 to perform the cutting is made according to a curve 5 which exhibits at least one change of direction.

For example, the trajectory exhibits at least one point of inflection I, for example by having a sinusoidal or substantially sinusoidal form.

In the embodiment more particularly described with reference notably to FIG. 2, the guide 3 comprises a longitudinal cavity 27 for passage of the chain 9.

The sheath is of determined width H, the insert 24 being arranged to perform the cutting over a width $2e$ of cutting line 6 greater than H.

The cavity 27 is provided on one side with a lateral wall 28 holed on either side defining a longitudinal slot 29.

For its part, the chain 9 comprises a number of lateral guiding cheeks 30, distributed regularly along the chain. The lateral cheeks 30 comprise peripheral edges 31 arranged to cooperate by friction (or by rolling) with the sides 32 of the slot 29 on the outer face of the holed lateral wall 28.

More specifically, each articulated link 21, 22 of the chain is formed by two parallel axes 33, 34 linked together by link plates or pads 35, 36, the lateral cheeks 30 forming some of these link pads between two adjacent axes.

To ensure the articulation of the chain, there is obviously a common axis between two adjacent links, the link pad of one link being laterally offset relative to that of the adjacent link, in a manner known per se.

Referring to FIG. 2, the cutting insert 24 is fixed onto the insert-holder 24' which is itself opposite a lateral cheek 30 or portion cooperating by friction with the cavity.

Figure 3:
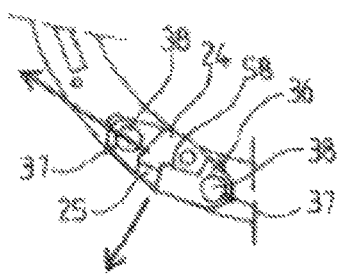
FIG. 3 is a plan view of a cutting insert according to one embodiment of the invention.
Figure 4:
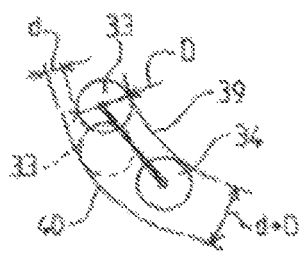
FIG. 4 is a schematic view illustrating the possibilities of movement of the axes of the links of a chain in its guide belonging to a device according to an embodiment of the invention.

As represented in FIG. 3, the tool-holder comprises two cylindrical voids 37 cooperating respectively with the end 38 of the axis of the adjacent links (or a slug secured to said end).

In the embodiment more particularly described here, the cavity 27 comprises two longitudinal ribs 39, 40, namely a first central internal rib 39 (see also FIG. 4) arranged to cooperate by rolling or friction with the axes 33, 34 of articulation between links and a second rib 40 opposite the first rib, the orthogonal distance between the first and the second rib being equal to D (diameter of the axes)+d with d≤0.5 mm, for example <0.1 mm.

Referring to FIG. 5 and with a chain 41 as described, it is possible to cut in the plate or block, according to multiple angles or directions of attack, and notably in the longitudinal direction, i.e. in a normal direction in relation to the blank of the chain (arrow 42) but also (by pivoting the chain and its guide) in rotation (arrow 43) relative to the longitudinal axis 44 of said chain (which attacks the block B according to the arrow 45), like a bucket loader.

A rotation (arrow 46) about an axis 47 at rightangles to the axis 44 also allows for other angles of attack.

FIG. 6 shows another embodiment of an insert 48, provided with the cutting edge 49 whose cheeks cooperate with the peripheral edges 50 of the guide 51.

The insert 48 is fixed onto the insert-holder by a slug coaxial with a link axis and by two fixing screws 53, the void 54 of the guide allowing or not allowing the link pads 55 to pass between the outermost link axes 56, the pads 57 corresponding to the innermost link pads.

In FIG. 6, the guide 51 is partly represented holed for greater visibility of the pads 55, 57 of oval form.

FIGS. 7A and 7B show an enlarged, partial and schematic view of the cutting insert 24.

The insert 24 comprises a setback 58 having a face 59 of straight or concave form following an acute or rightangle a relative to the cutting edge 25, and more specifically in relation to its internal cutting face 60, arranged to break up the chips 61 (or 61') generated at the cutting face.

The insert is, for example, removable by virtue of fixing means such as screws (not represented).

Referring to FIG. 8, and when the chain is of great length (greater than 1 m), the guide 62 may have a tendency to sag (arrow 63 and curve 64).

So as to keep the cutting chain as conformal as possible to its programmed cutting position, and thus avoid a troublesome arrow f, the guide is traction prestressed (arrows 65), for example with a force of 50 daN, then the ends 66 of the guide are blocked in a manner known per se, the guide 62 being immobilized.

FIGS. 9 to 11 show three sets of plates obtained with the device and/or the method according to the embodiment of the invention more particularly described here.

FIG. 9 shows an assembly 67 of two plates 68, 69 obtained by cutting a metal 70 or composite block (for example made of thermosetting resin and carbon fibers) of a composition conventionally adopted in the context of the manufacturing of airplane structures or parts in the aerospace or automobile fields, extending about a plane 71 (chain-dotted lines) cut with the device 1 described above.

More specifically, the assembly comprises a first plate 68 having a top face 72 and a second plate 69 having a bottom face 73, the top face 72 of the first plate having a surface with at least one line of inflection 74 relative to the plane 71, the bottom face 73 being of a complementary form obtained by cutting of the block over a constant height 2e (FIG. 1B).

Advantageously, the length and/or the width of the plates is greater than 600 mm and/or the thickness E of the block is greater than 600 mm (even though this thickness can perfectly well be very much smaller, as is the case in aeronautics where the thickness is often less than 300 mm).

FIG. 10 shows another assembly 75 of two plates or parts 76, 77, namely a small parallelepipedal plate 77 and a base plate 76 surrounding it, the duly formed pocket being non-emergent.

In this case, a groove of the form of the pocket and of the depth of said pocket is produced first in a manner known per se, then a device like that described with reference to FIG. 5 is then lowered into the groove, then translated to weaken the block 77.

FIG. 11 shows another embodiment of a block 78 that makes it possible to obtain two plates 79-80 having a number of lines of inflection in this case the parallel lines 81, 82, 83, 84, 85 and 86 making it possible to obtain a bottom part 79 with two reinforcing ribs 87 and 88 in the longitudinal direction, and a top part 80 with ribs 89 and 90 complementing the voids opposite.

In FIG. 11A, a first bottom plate 91 is represented schematically in cross section, cut from the block 95 by the chain 92, a chain which leaves the block at 93 and 94, which makes it possible to obtain a number of separate parts 96, 97 complementing the first plate.

The manufacturing of the assembly 67 by using the device of FIG. 1 will now be described.

Having chosen the block of metal or composite material corresponding to the parts that are to be manufactured, the cutting that is to be done is programmed via the programmable logic controller.

The guide is chosen as a function of the parameters necessary for the manufacturing and can for example be designed to be dismantleable and removable to allow cutting line thicknesses 2e of different widths, for example of between 1 cm and 2 cm.

The block 2 is then placed facing a cutting device. The cutting is then performed in a manner known per se, the chain being permanently lubricated, for example via an injection of lubricant at different points of injection of the guide regularly distributed along the latter.

The part 2 is then advanced by being pushed on the saw or, on the other hand, it is the device itself which is displaced over the part which has then been previously fixed in a manner known per se onto a support (not represented) also acting as a stiffener.

The guide and the cutting inserts are then progressively pushed facing the block 2, little-by-little separating the top and the bottom parts 68 and 69, the chain here being pushed in the transverse direction of the block. In the case for example of manufacturing of plate of the type of that indicated in FIG. 11, the displacement of the saw will this time be performed in the longitudinal direction of the plates.

As the saw cuts, the chips are easily expelled, notably through the existence of the chip breaker of the type described above.

The plates 68 and 69 are, moreover, progressively grasped and held in a manner known per se, to be then discharged.

By virtue of the invention, it is thus possible to obtain two plates of very similar form with a very small loss of material and/or of metal, namely and only the thickness of the cutting line 2e.

These parts that are very close to the final machined form can then be finalized without excessive difficulties.

As goes without saying and as results moreover from the above, the present invention is not limited to the embodiments more particularly described. On the contrary, it encompasses all the variants thereof and notably those in which not just two opposing parts are cut simultaneously, but a set of three parts or even four parts nested in one another, in which case the cutting inserts and their guide will be configured accordingly.

In one embodiment, the trajectory of the chain is then made to exit from the block and to return thereto one and/or more times (as many times as there are parts in addition to the bottom part or plate).

The invention claimed is:

1. A device for cutting at least two mutually nested corresponding parts from a block of metal or composite material following a determined trajectory, comprising
a guide following said trajectory which has at least one point of inflection and an endless articulated chain, wherein the chain is slidingly mounted in the guide,
the guide comprising a cavity for passage of the chain, the cavity comprising one first rib arranged to cooperate by friction or rolling with axes of mutual articulation of links in the chain and a second rib opposite the first rib, the first and second ribs extending toward each other, and
the guide being of a determined width and wherein the chain extends about a first plane and comprises a lateral blank having a face extending in a second plane parallel to the first plane and on the face of the lateral blank is provided at least one cutting insert forming at least one cutting element, the at least one cutting insert having a cutting edge width greater than that of the guide, or the at least one cutting insert comprising multiple cutting inserts cumulatively providing a continuous cutting edge width greater than that of the guide; and wherein the cutting element comprises a cutting portion protruding in a direction normal to the second plane defined by the face of the lateral blank, the cutting portion having a cutting edge arranged to perform the cutting in direction normal to the second plane defined by the face of the lateral blank, while the guide and the at least one cutting insert progressively penetrate into the block according to a translational movement parallel to the cutting direction.

2. The device as claimed in claim 1, wherein the chain comprises a number of cutting inserts arranged so that cutting edges of at least two inserts are staggered with an overlap of less than 2 mm.

3. The device as claimed in claim 1, wherein the guide forms a trajectory having at least two points of inflection.

4. The device as claimed in claim 1, wherein the at least one cutting insert is removable and comprises means for screw-fixing onto an insert-holder.

5. The device as claimed in claim 1, wherein the trajectory and/or the guide has a concave curve in a first direction followed by a concave curve facing a second direction opposite the first direction with at least one point of inflection.

6. The device as claimed in claim 1, wherein the chain comprises a number of lateral guiding cheeks distributed regularly along the chain, said cheeks comprising peripheral edges arranged to cooperate by friction or rolling with sides of a slot of said guide.

7. The device as claimed in claim 6, wherein links are formed by two parallel axes linked together on either side by a link plate, the lateral guiding cheeks are formed by certain of the link plates between two adjacent axes.

8. The device as claimed in claim 7, wherein the at least one cutting insert being fixed onto a lateral cheek forming an insert-holder, the insert-holder comprises two cylindrical voids cooperating respectively with the end of the axes of adjacent links and/or a slug secured to said end of the axes of adjacent links.

9. The device as claimed in claim 1, further comprising means for laterally clamping the guide at its ends, arranged to maintain and rigidify the guide in three directions of an axonometric reference frame.

10. The device as claimed in claim 1, wherein the at least one cutting insert comprises a setback having a face of concave form following an acute or right angle in relation to the cutting edge, arranged to break up chips generated at said cutting edge.

11. The device as claimed in claim 1, wherein an orthogonal distance between the first and the second ribs is equal to diameter D of the axes of mutual articulation plus distance d, with d<0.1 mm.

12. The device as claimed in claim 1, wherein the at least one cutting insert is fixed onto a lateral cheek forming an insert-holder.

13. The device as claimed in claim 1, wherein the guide is prestressed in a longitudinal direction of the chain and/or of the guide.

14. The device as claimed in claim 1, further comprising an emulsion lubrication sprayer for an interior of the guide.

15. A method for cutting at least two mutually nested corresponding parts from a block of metal or composite material, by a cutting device following a determined trajectory, in which an endless articulated chain is slidingly mounted in a guide following said trajectory which has at least one point of inflection, the guide comprising a cavity for passage of the chain and, the cavity comprises at least one first rib arranged to cooperate by friction or rolling with axes of mutual articulation of links in the chain and a second rib opposite the first rib, the first and second ribs extending toward each other, the guide being of a determined width, and wherein said chain extends about a first plane and comprises a lateral blank having a face extending in a second plane parallel to the first plane and the face of the lateral blank is provided at least one cutting insert forming at least one cutting element, the at least one cutting insert having a cutting edge width greater than that of the guide, or the at least one cutting insert comprising multiple cutting inserts cumulatively providing a continuous cutting edge width greater than that of the guide; and wherein the cutting element is provided with a cutting portion protruding in a direction normal to the second plane defined by the face of the lateral blank, the cutting portion having a cutting edge, and, said cutting is performed with said endless articulated chain in said normal direction, while the guide and the at least one cutting insert progressively penetrate into the block according to a translational movement parallel to the cutting direction.

16. The method as claimed in claim 15, wherein said cutting is performed over a length L of part greater than or equal to 600 mm.

17. The method as claimed in claim 15, wherein said cutting is performed over a thickness E of block less than 300 mm.

18. The method as claimed in claim 15, wherein the guide is traction prestressed before cutting.

19. The method as claimed in claim 15 comprising cutting the part from a block of metal.

* * * * *

UNITED STATES PATENT AND TRADEMARK OFFICE
CERTIFICATE OF CORRECTION

PATENT NO. : 11,370,139 B2
APPLICATION NO. : 14/899728
DATED : June 28, 2022
INVENTOR(S) : Bonnet et al.

Page 1 of 1

It is certified that error appears in the above-identified patent and that said Letters Patent is hereby corrected as shown below:

On the Title Page

Column 1, (71) Applicant Line 1:
After "Amboise", insert --Cedex--

Column 1, (73) Assignee Line 1:
Delete "Mecacahrome" and insert --Mecachrome-- therefor Column 1, (73) Assignee Line 1:
After "Amboise", insert --Cedex--

In the Claims

Column 8, Claim 1 Line 55:
After "comprising", insert --:--

Signed and Sealed this
Twenty-second Day of November, 2022

Katherine Kelly Vidal
*Director of the United States Patent and Trademark Office*